United States Patent [19]
Richardson

[11] 3,972,231
[45] Aug. 3, 1976

[54] METHOD FOR MEASURING VELOCITY AND DIRECTION OF CURRENTS IN A BODY OF WATER

[75] Inventor: William S. Richardson, Dania, Fla.

[73] Assignee: The United States of America as represented by the Secretary of the Navy, Washington, D.C.

[22] Filed: Nov. 19, 1975

[21] Appl. No.: 633,538

[52] U.S. Cl. .............................. 73/170 A; 73/189
[51] Int. Cl.² ........................................ G01W 1/00
[58] Field of Search ................. 73/170 A, 189, 188

[56] References Cited
UNITED STATES PATENTS

| | | | |
|---|---|---|---|
| 1,960,735 | 5/1934 | Frank et al. | 73/188 |
| 2,320,359 | 6/1943 | Gatty | 73/188 |
| 3,336,803 | 8/1967 | Thorndike | 73/170 A |
| 3,623,362 | 11/1971 | Gerard | 73/189 |
| 3,834,229 | 9/1974 | White | 73/170 A |

*Primary Examiner*—James J. Gill
*Assistant Examiner*—Anthony V. Ciarlante
*Attorney, Agent, or Firm*—R. S. Sciascia; Paul S. Collignon

[57] ABSTRACT

A method for measuring the velocity and direction of currents in the ocean and other bodies of water. A first vehicle travels through water and leaves behind a trail of dye. A second vehicle travels, at a later time, the same path as that traveled by the first vehicle, and measures the distance and direction to the trail of dye. The vehicles may travel either from the surfaces downwardly or from the bottom upwardly.

6 Claims, 5 Drawing Figures

METHOD FOR MEASURING VELOCITY AND DIRECTION OF CURRENTS IN A BODY OF WATER

BACKGROUND OF THE INVENTION

The present invention relates to a method for measuring velocity and direction of currents in bodies of water, such as an ocean, and more particularly to a method for making and recording a plurality of readings of current velocity and direction at various depths.

Oceanographic instruments for sensing and indicating velocity components and current flows are generally of a moored or fixed type or of a traveling type. Although the more commonly type is of the moored or fixed type, the main disadvantage is that readings are obtained for only one depth and it is usually desirable to know current velocities at a plurality of depths.

One such fixed device for measuring current flows is shown and described in U.S. Pat. No. 3,695,103, which issued Oct. 3, 1972, to Franklyn C. W. Olson. In this device, a buoyant sphere is anchored at a desired depth by a trio of taught wires containing strain gages. The outputs of the strain gages, which is affected by the direction and magnitude of the current, are fed into a computer which converts the readings into a resultant velocity and direction of current flow.

In U.S. Pat. No. 3,623,362, which issued Nov. 30, 1971, to Robert D. Gerard, there is shown and described a current measuring device for recording current during the free fall and rise of an instrument. Direction is obtained by taking readings from a magnetic compass and current velocity is determined by four transducers which are mounted, two each, on the ends of two probes, which are rotated in the water being checked.

SUMMARY OF THE INVENTION

The present invention relates to a method for measuring ocean currents at a plurality of depths. A first vehicle travels through water leaving a trail of dye and after a time delay, a second vehicle travels the same path as the first vehicle and measures the distance from the second vehicle to the dye path.

In one embodiment of the invention, the first and second vehicles are connected together, weighted, and dropped to the ocean bottom. Upon contact with the bottom, the first vehicle is released and rises to the surface under its own buoyancy. During ascent, a concentrated trail of fluorescein dye is released. After a preselected time delay at the bottom, the second vehicle is released and rises to the surface. The second vehicle is provided with a recording optical range-finder which measures the distance and direction to the trail of fluorescein dye left by the first vehicle. Each recording of the direction and distance to the dye trail gives a current vector at that depth and an essentially continuous profile of current speed and direction with depth is achieved.

In another embodiment of the invention, a weighted vehicle is released from the surface and free-falls to the ocean bottom. During descend, a trail of fluorescein dye is released from the first vehicle. After a specific delay, a second vehicle is released and free-falls over substantially the same path as the first vehicle. The second vehicle has a recording optical range-finder which measures the distance and direction to the trail of fluorescein dye.

It is therefore a general object of the present invention to provide a method for measuring horizontal currents at a plurality of depths in a body of water.

Other objects, advantages and novel features of the invention will become apparent from the following detail description of the invention when considered in conjunction with the accompanying drawings.

DESCRIPTION OF THE PREFERRED EMBODIMENT

Figure 1:
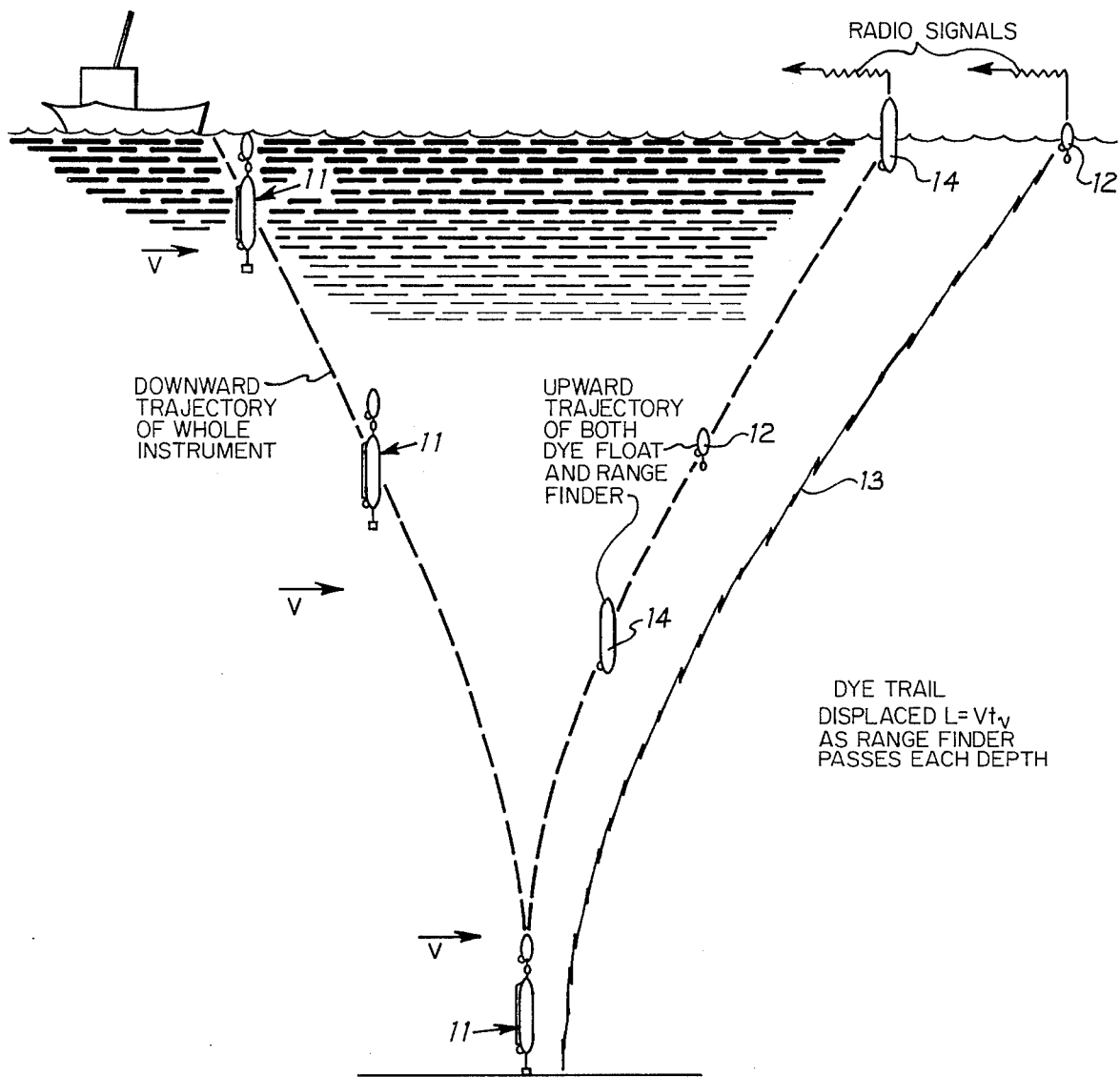
FIG. 1 is a diagrammatic presentation of a typical sampling of currents in a body of water in an ascending mode.

Referring now to the drawings, and particularly to FIG. 1, there is shown an instrument 11 consisting of two buoyant parts that is weighted and dropped to the ocean bottom. On contact with the bottom, the first of the two parts, which is streamlined, spin-stabilized float 12, releases and rises to the surface under its own buoyancy. In so doing, it leaves behind a concentrated trail of fluorescein dye 13. After a preselected time delay at the bottom, a second float 14, which is also streamlined and spin-stabilized, releases and rises to the surface. The second float 14 contains a recording optical range-finder 15 which measures the distance and direction from itself to the trail of fluorescein dye 13 left by the first float 12.

By way of example, suppose that the time delay between the two floats 12 and 14 is 100 seconds and that they rise at the same rate (not a necessary or even desirable condition). The second float 14 will follow the same path taken by the first float 12 (since the current as a function of depth will not have changed significantly in 100 seconds), but the dye trail 13 left by the first float 12 will, at every depth, be displaced by 100 seconds of flow (1 meter for each centimeter per second horizontal current speed) in the current direction. Therefore, each recording of the direction and distance to the dye trail 13 gives a current vector at that depth, and an essentially continuous profile of current speed and direction with depth is achieved.

It is easily shown that the range-finder to dye-trail distance $r_z$ at any depth $z$ measured up from the bottom is $$\vec{r}_z = (\vec{V}_{av} - \vec{V}_z)\left(\frac{z}{R_1} - \frac{z}{R_2}\right) + \vec{V}_z t_D \quad (1)$$

where:

$\vec{V}_{av}$ is the average velocity from the bottom to depth $z$, $\vec{V}_z$ is the velocity at depth $z$, $R_1$ and $R_2$ are the rates of rise of the dye-releasing float and the range-finding float, respectively, $t_D$ is the time delay between the release of the two floats at the bottom.

Obviously, if the two rise rates, $R_1$ and $R_2$ are equal, the situation described above applies and $V_z$ vs. depth is determined.

The distance over which one might reasonably expect to range-find in the ocean is discussed later. Assuming for the moment that this is from 1.5 to 30 meters, then with a 100-second delay time the dynamic range of the instrument is 1.5 to 30 cm/sec.

If one were particularly interested in the weaker currents of the deep ocean, the delay time could be increased, which would decrease the dynamic range and increase the sensitivity to low speeds. Alternatively, the rise speeds (buoyancy) of the two floats 12 and 14 could be adjusted so that the range-finding float 14 could be delayed longer at the bottom, but would catch up to the dye-releasing float 12 on the way up ($R_2 > R_1$). Thus the longer time delay would be available for the weaker, deep currents, but the delay would decrease linearly during the rise, so that the stronger currents near the surface would be within the detection range. If each float were equipped with a radio transmitter (desirable for location in any case), the difference in their surfacing time becomes known and the linear catch-up is also known. Referring to equation (1), it is necessary to perform a running integration in this case to get $\overline{V}_{av}$.

The range-finder used herein is not the two-pupil type commonly used on ships and for surveying, but it is more closely akin to the ceilometer used at airports to determine the height of the cloud base. In this, a well-collimated beam is projected and the angle is measured from a point a known distance away from the searchlight to the intersection of the beam and the cloud (dye).

Figure 2:
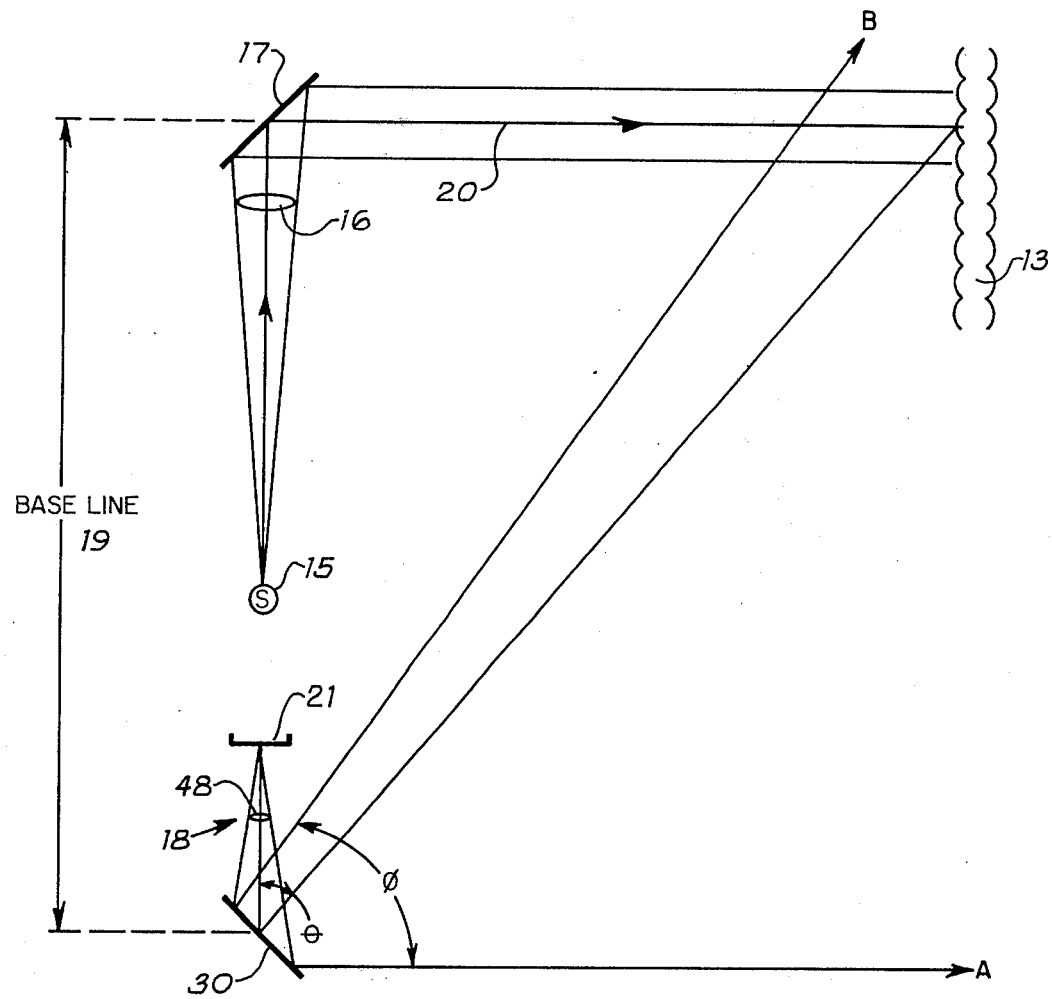
FIG. 2 is a diagrammatic view of a recording scheme.

Referring now to FIG. 2 of the drawings, there is illustrated one device for recording the distance to dye trail 13. A searchlight, composed of a light source 15 and lens 16, having a diameter $d$ and focal length $f$, has a mirror 17 which projects light at 90° to the optical and mechanical axis of float 14. As float 14 rotates during its ascension, the projected light will strike dye trail 13 once each revolution of float 14. At the other end of the float 14 is a camera 18 with a mirror 30 and a lens 40 of focal length F and diameter D, having a fairly wide angle of view ($\phi = 45°$). It is separated from the searchlight by a baseline 19 (typically 1.5 meters). The outer ray A of the camera 18, intersects the light beam at some large (unachievable) range and the inner ray B sets the minimum detectable range (typically 1.5 meters). In the figure, the point of intersection of the light beam and the dye trail intersects the baseline 19 at angle $\theta$. Obviously, as the range is increased or decreased, the angle will increase or decrease, that is, the image will move across film 21 in camera 18.

With the geometry shown in FIG. 2 of the drawings, the energy received at the film can readily be computed as a function of source energy and range. Let the source be of energy, $E_o$, then the projection system collects energy, E:

$$E = E_o \frac{d^2}{16f^2}. \quad (2)$$

At a range, L, this is attenuated by absorption (scattering neglected) by a factor of $e^{-\alpha_s L}$, where $\alpha_s$ is the absorption coefficient for the source wavelength. At this range the light also is spread over an area, A:

$$A = \frac{L^2 A_o}{f^2}, \quad (3)$$

where $A_o$ is the projected area of the source. When the energy strikes the dye, we may assume (if the dye is concentrated) that it is absorbed by a thin plane and the dye will fluoresce with quantum efficiency, Q, and therefore appear as a source of luminance (energy/unit area), $I_s$, where $$I_s = \frac{QE}{2A} = \frac{QE_o d^2}{32 L^2 A_o} \quad (4)$$

For such a target with another absorbing path $e^{-\alpha_F L}$, where $\alpha_F$ is the absorption coefficient for the fluorescence wavelength, the illuminance (energy/unit area) on the film with be $I_f$.

$$I_f = \frac{I_s D^2 e^{-\alpha_F L}}{8F^2} = \frac{QE_o d^2 D^2 e^{-(\alpha_S + \alpha_F)L}}{256 F^2 L^2 A_o} \quad (5)$$

Assume now that light source 15 is a blue line of a 50-watt mercury arc lamp (not necessarily the best choice, but a reasonable candidate). Such a lamp puts out approximately 4% of its total power (2 watts, or $2 \times 10^7$ ergs/sec) in the blue line at 440 m$\mu$, where for clear ocean water $\alpha_s = 0.1$ $m^{-1}$. This line is very efficient for excitation of the fluorescence of fluorescein; $Q = 0.8$. A typical 50-watt lamp has a projected emitting area $A_o$, of about 0.03 cm$^2$, assuming an exposure time of 0.1 second for the camera, $E_o$ will be $2 \times 10^6$ ergs.

We may further assume that we will wish to keep the projecting optics of reasonable diameter, say 4 inches or 10 cm, and that the camera can have a very fast lens (image quality is not a serious consideration) of $f/1.5$, so that $D^2/F^2 = 0.45$.

Finally, we note that the fluorescence of the dye is confined to a band centered on 510 $m$, where $\alpha_F = 0.05$ $m^{-1}$ for clear ocean water. Inserting these values into equation 5 gives $$I_f = \frac{940}{L^2} e^{-0.15L} \quad (6)$$

with L in meters and $I_f$ in ergs/cm$^2$. We may then tabulate $I_f$ as a function of L as follows:

TABLE I

| L (meters) | $I_f$ (ergs/cm$^2$) |
|---|---|
| 5 | 18.0 |
| 10 | 2.1 |
| 15 | 0.46 |
| 20 | 0.12 |
| 25 | 0.036 |
| 30 | 0.011 |
| 40 | 0.0015 |
| 50 | 0.00021 |
| 60 | 0.00003 |

If we now consider the fastest readily available film (Eastman-Kodak Type 2485), we find that in the spectral region of interest (500–550 m$\mu$) its sensitivity is as follows:

for good exposure — 0.01 ergs/cm$^2$
for marginal exposure — 0.001 ergs/cm$^2$ for minimum recoverable exposure — 0.0001 ergs/cm²

It can thus be seen that by using the fastest available film, a range of 30 meters can readily be reached and that a range as far as 50 meters might be reached.

In the above computation, scattering has been neglected because the absorption loss due to scattering particles in clear ocean water is small. The usual difficulty caused by scattered light in underwater photography is the loss of contrast because of the backscattering of the source light. However, in the case described here, the source light will be blue and the image light will be green, so that by putting a blue filter over the source and a green filter over the camera lens, the scattered source light will not be seen and therefore will not reduce contrast.

From these considerations it can be seen that the 30-meter range seems conservative and that, in all probability, the dynamic range of the instrument with a 100-second time delay will more likely be 1.5 – 40 or perhaps even 50 cm/sec.

Figure 3:
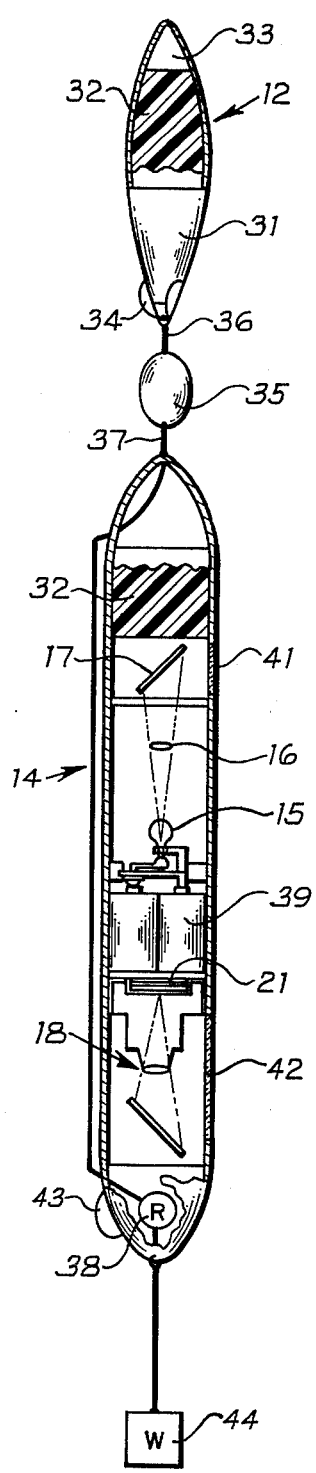
FIG. 3 is a sectional view of apparatus designed for use in an ascending mode as shown in FIG. 1 of the drawings.

Referring now to FIG. 3 of the drawings, there is shown one embodiment of an instrument adaptable for use with the method of the present invention. A first float 12 has a free flooding body 31 which has part of its upper portion filled with material 32, such as a foam material, for providing buoyancy. Above the foam material 32 there is a space or compartment 33 adaptable for receiving a radio transmitter which is heard when float 12 reaches the surface. The lower portion of float 12 is provided with spin stabilizing fins 34. A dye packet 35 is attached by a line 36 to float 12 and then by a line 37 to a release mechanism 38 in float 14.

Float 14 is also provided with buoyant material 32 in its upper portion and is also preferably provided with a radio transmitter in its upper nose cone. The light source 15, lens 16 and mirror 17, which are shown in FIG. 2 of the drawings, are mounted in a compartment of float 14 and batteries 39 are provided for energizing light source 15. A window 41 is provided opposite mirror 17 through which light beam 20 passes. Camera 18 and film 21 are mounted below batteries 39 and a window 42 is provided opposite camera 18. The lower portion of float 14 is provided with spin-stabilizer fins 43 so that float 14 will rotate as it rises to the surface. By way of example, fins 43 are designed to impart one full revolution to float 14 when float 14 rises ten feet. A weight 44 is attached to release mechanism 38 and is of sufficient mass to sink both float 12 and float 14.

OPERATION

In operation, floats 12 and 14 are connected together and dropped into a body of water, such as an ocean. It is anticipated that the floats will descend at about two meters per second and an electrical time delay is set so that light source 15 is energized about five minutes before reaching the bottom, in order to save battery power. Camera 18 is started at the same time and the film 21 runs continuously through the camera and no shutter is required.

Figure 5:
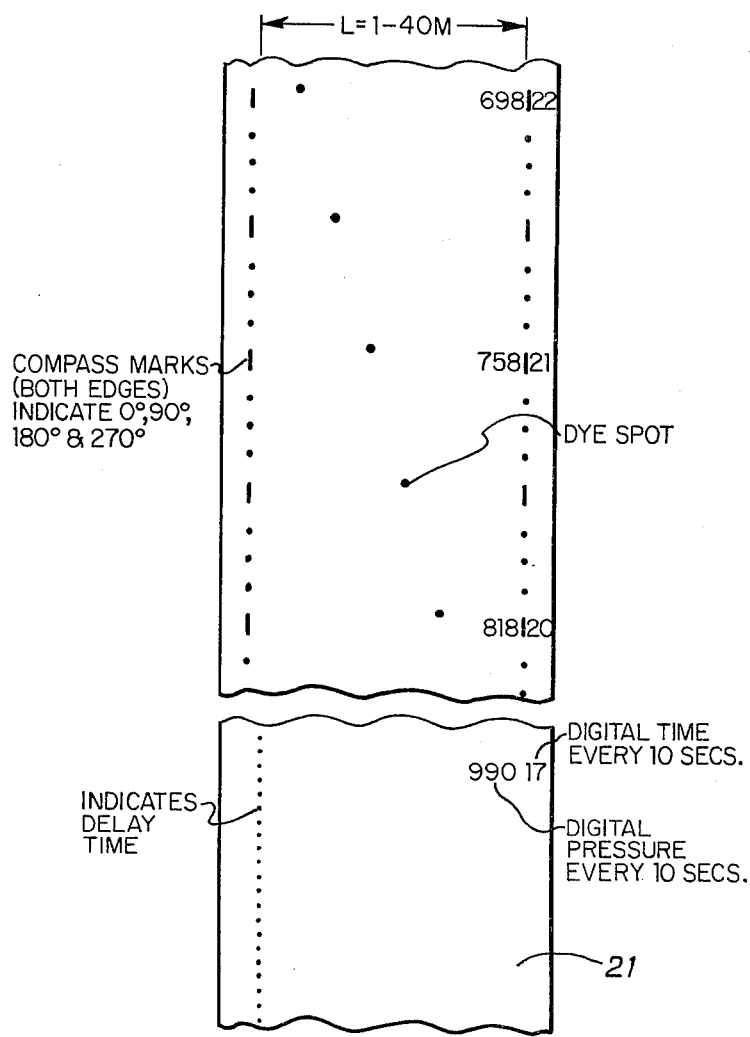
FIG. 5 is a plan view of a strip of film showing various indicia and dye spots thereon.

Upon reaching the bottom, the release sequence is activated, thereby first releasing float 12 and starting a mechanical timer that sets the time delay between floats 12 and 14. While the delay timer is running, the delay time is marked directly on film 21, as shown in FIG. 5 of the drawings. When float 12 is released, dye packet 35 is opened and, as float 12 rises to the surface, dye trail 13 is created, as shown in FIG. 1 of the drawings. After a specified delay time, release mechanism 38 is triggered and weight 44 is detached from float 14. The spin-stabilizer fins 43 cause float 14 to rotate and, by way of example, float 14 might turn one revolution every five seconds during ascension of float 14 at a rate of about 2 meters per second. Accordingly, the searchlight beam 20 will impinge on dye trail 13 once every ten meters of travel and this distance becomes the vertical revolution of the instrument. As float 14 rises, film 21 runs continuously through camera 18 and a light blip, which is created by beam 20 impinging on the fluorescein dye, is marked on film 21 during each revolution of float 14. Also various other markings are made on film 21 as it runs through camera 18. For example, as shown in FIG. 5 of the drawings, marks are made showing time delay between release of floats 12 and 14, time and pressure indications are made and also compass marks are made so that the direction of the current being measured can be determined. As best shown in FIG. 2 of the drawings, the point of intersection of beam 20 and dye trail 13 intersects the baseline 19 at an angle $\theta$. As the range to dye trail 13 is increased or decreased, angle $\theta$ will increase or decrease and a blip or image will move across the film and its position on the film will represent the range to dye trail 13.

Each of the floats 12 and 14 are provided with a radio transmitter which can be heard when the floats reach the surface. These sounds, when monitored, provide a check of surfacing time and any catch-up or lag of the second float 14 can be determined. Also the radio signal will help in recovery and location of the floats, and their relative positions provide a direct measurement of the surface current. The direction from float 14 to float 12 indicates the direction of the surface current and the separation distance between the two floats divided by the time delay gives the speed of the surface current.

SECOND EMBODIMENT

The instrument shown in FIG. 3 of the drawings employs a shutterless camera and can be used from the bottom to the surface at night. During daytime, the instrument can be used at depths greater than 400 meters but cannot be used in the upper 300–400 meters.

Figure 4:
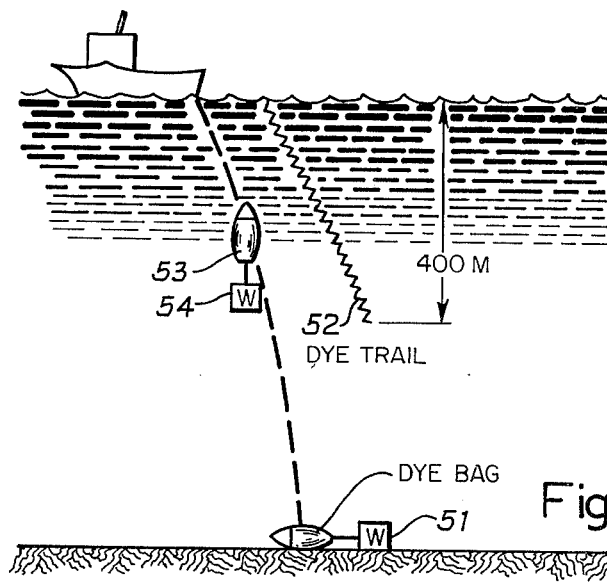
FIG. 4 is a diagrammatic presentation of a sampling of currents in a body of water in a descending mode.

FIG. 4 of the drawings shows a method for measuring current in the upper region of a body of water during daylight. A similar instrument which falls from the surface is used with ambient daylight serving as a light source. A shutterless camera is replaced with a time-lapse 8-mm camera which looks out horizontally. The time-lapsing is set so that as the instrument falls and rotates, a film of overlapping angular segments is obtained. Typically, the angular field of view (in water) of such a camers is 35°, so that 12 pictures per rotation will suffice to see the dye trail once in each rotation. The 2400 frames on a 50 foot roll of film will then give 200 pictures of the trail, programmed by fall rate (about 1 meter/second) and rotation rate (about once every 2 meters) to a depth of typically 400 meters at 6 frames/second.

The dye float 12 is replaced by an expendable plummet 51 which leaves a dye trail 52 and falls at the same rate as, or a known different rate from, the range-finder 53, which is time-delayed at the surface by a known amount. The range-finder float drops its weight 54 at about 400 meters, which is deeper than the point at which there is light enough for it to record, and the range-finder is recovered.

The dye trail 52 left behind the plummet 51 will have many small and easily identified swirls, eddies and other singular features in it. For any one of these features which can be identified in two successive pictures of the trail, we then have, in effect, a stereo-pair with a known baseline of 2 meters, which will permit a range measurement. The usable range will be from about 3 meters to as far as the dye can be observed with the ambient light.

In this case, the governing equation is $$\vec{y_z} = (\vec{V}_{av} - \vec{V}_z)(\frac{z}{F_1} - \frac{z}{F_2}) + t_D(\vec{V}_z - \vec{V}_s) \qquad (6)$$

where:
  $z$ is now measured downward,
  $F_1$ and $F_2$ are the fall rates,
  $\vec{V}_s$ is the surface current.

With $F_1$ and $F_2$ equal, the shear $(\vec{V}_z - \vec{V}_s)$ is measured.

If the drop is made to a depth where there is not enough light for it to record, its record will overlap the record of a bottom instrument, and a complete profile to the surface can be deduced from the two records, even in the daytime. Of course, $\vec{V}_s$ also is available from the bottom instrument in the daytime.

The daylight instrument has another identical, synchronized camera which photographs a data panel consisting of a clock, a compass and a pressure gauge. This data will assure a known base line for the stereo-pairs and will give the depth and the direction of the vector $\vec{r}_z$.

It can thus be seen that the present invention provides a method for measuring the velocity and direction of a current at a plurality of depths. Obviously many modifications and variations of the present invention are possible in the light of the above teachings. It is therefore to be understood that within the scope of the appended claims the invention may be practiced otherwise than as specifically described.

I claim:

1. A method for measuring velocity and direction of currents in a body of water comprising the steps of,
   first depositing a vertical trail of dye in a body of water having a current, said trail of dye being deposited from a moving vehicle traveling a path through said body of water, and
   then, after a time period, traversing a second moving vehicle over the same path said first moving vehicle traveled and measuring from said second moving vehicle the positions of said vertical trail of dye at a plurality of depths to determine speed and directions of currents at a plurality of depths.

2. A method for measuring velocity and direction of currents in a body of water as set forth in claim 1 wherein said vertical trail of dye is deposited from the bottom of said body of water upwardly to the surface.

3. A method for measuring velocity and direction of currents in a body of water as set forth in claim 1 wherein said first and second vehicles are connected together and are sank and then said first vehicle is released and floats to the surface and, after a time period, said second vehicle is released and floats to the surface.

4. A method for measuring velocity and direction of currents in a body of water as set forth in claim 1 wherein a beam of light is projected onto said trail of dye from said second vehicle and the point of intersection of said beam of light and said trail of dye is recorded on film in said second vehicle.

5. A method for measuring velocity and direction of currents in a body of water as set forth in claim 1 wherein said dye is fluorescein dye.

6. A method for measuring velocity and direction of currents in a body of water as set forth in claim 1 wherein said vertical trail of dye is deposited from the surface downwardly to a depth of about 400 meters.

* * * * *